United States Patent [19]

Ambrose

[11] Patent Number: 4,962,590
[45] Date of Patent: Oct. 16, 1990

[54] APPARATUS AND METHOD FOR TESTING PARAMETERS OF INVOLUTE GEARS AND PINIONS

[76] Inventor: Wilfred G. Ambrose, 4527 W. Orangewood Ave., Glendale, Ariz. 85301

[21] Appl. No.: 338,541

[22] Filed: Apr. 13, 1989

Related U.S. Application Data

[63] Continuation of Ser. No. 87,225, Aug. 20, 1987, abandoned.

[51] Int. Cl.$^5$ ............................ G01B 5/20; G01B 5/24; G01M 13/02
[52] U.S. Cl. ............................ 33/501.14; 33/501.15; 33/501.18
[58] Field of Search ............... 33/179.5 D, 179.5 R, 33/501.14, 501.15, 501.16, 501.17, 501.18; 73/162

[56] References Cited

U.S. PATENT DOCUMENTS

| | | | |
|---|---|---|---|
| 1,554,646 | 9/1925 | Olson | 33/179.5 D |
| 1,564,585 | 12/1925 | Laessker | 33/179.5 D |
| 1,601,038 | 9/1926 | Orcott | 33/179.5 D |
| 1,753,014 | 4/1930 | Logue | 33/179.5 D |
| 2,026,649 | 1/1936 | Olson | 33/179.5 D |
| 2,313,133 | 3/1943 | Ernst | 33/179.5 D |
| 2,938,275 | 5/1960 | Hofler | 33/179.5 R |
| 3,089,249 | 5/1963 | Muller | 33/179.5 R |
| 3,237,442 | 3/1966 | DeVos | 33/179.5 R |
| 3,757,425 | 8/1973 | Bouillon et al. | 33/179.5 D |
| 3,877,150 | 4/1975 | Hofler | 33/179.5 D |
| 4,274,207 | 6/1981 | Flair | 33/179.5 D |
| 4,276,699 | 7/1981 | Sterki et al. | 33/179.5 D |
| 4,356,556 | 10/1982 | Sterki | 33/179.5 D |
| 4,457,074 | 7/1984 | Golder | 33/179.5 D |
| 4,646,443 | 3/1987 | Hofler | 33/179.5 R |

FOREIGN PATENT DOCUMENTS

| | | | |
|---|---|---|---|
| 857283 | 11/1952 | Fed. Rep. of Germany | 33/179.5 D |
| 1229373 | 4/1971 | United Kingdom | 33/179.5 A |

*Primary Examiner*—Thomas B. Will
*Attorney, Agent, or Firm*—William W. Holloway

[57] ABSTRACT

Apparatus for measuring departures from specified parameters for involute type gears and pinions is described. Wheels having a radius of the gear base circle are coupled to the axis of the gears. The base circle radius wheels travel along parallel tracks as the gear/wheel assembly is rotated. To measure the departure of a gear tooth contour from an ideal profile, a probe is forced against the tooth surface on a line tangent to the base circle radius. By definition of an involute gear or pinion, travel of the gear on the base circle results in the tooth profile passing through a point fixed in space on the line tangent to the base circle. By placing the probe in contact with the gear tooth surface on the base circle tangent line, the tooth contour will pass through the point. The probe therefore can determine departures from an ideal tooth profile by displacement of the probe during the travel of the gear/wheel assembly. Similarly, by placing two probes against adjacent gear tooth surfaces (facing the same direction) on the tangent to the base circle, the base pitch parameter can be measured.

15 Claims, 3 Drawing Sheets

APPARATUS AND METHOD FOR TESTING PARAMETERS OF INVOLUTE GEARS AND PINIONS

This is a continuation of co-pending application Ser. No. 087,225, filed on Aug. 20, 1987, now abandoned.

BACKGROUND OF THE INVENTION

1. Field of the Invention

This invention relates generally to gears and pinions and, more particularly, to apparatus and procedures for verifying parameters of an involute gear or pinion.

2. Description of the Related Art

The use of gears to transfer rotational motion from one shaft to another shaft is well-known in modern industrial practice. One type of gear is the involute gear or pinion, a gear configuration that has been widely used in the railroad industry. The involute gear is especially desirable in those applications where the center of the gear or pinion can not be maintained with precision.

In the fabrication of the gear, maintaining of precise tolerances is essential. Otherwise, the gear or pinion can develop excessive wear and can be unsuitable for operation after an unacceptably short period of time. Thus, the user of a gear or pinion will typically want to verify that the measurements of the apparatus are within specified tolerances. Similarly, it is frequently desirable to measure the gear or pinion after extended use. Unacceptable departures from the original profile can identify design problems in the apparatus utilizing the gear or pinion or defective workmanship or materials in the fabrication of the gear.

At present, complex automatic apparatus is available for testing and verifying the parameters of involute gears and pinions. The automatic apparatus involves the use of fulcrum points, linkage apparatus and ratio arms. While this apparatus provides acceptable testing and verification of the gear or pinion parameters, the apparatus is expensive and requires trained personnel for its operation. In addition, the measuring apparatus is bulky and is unsuitable for use in the field.

A need has therefore been felt for apparatus for verifying the parameters of an involute gear or pinion that is relatively inexpensive to manufacture, is simple to operate and which can be easily transported to remote locations to perform the measurements in the vicinity of the machines using the involute gear or pinion.

FEATURES OF THE INVENTION

It is an object of the present invention to provide improved apparatus for the measurement of parameters of gears and pinions.

It is a feature of the present invention to provide apparatus for measuring parameters of gears and pinions having an involute configuration.

It is another feature of the present invention to provide apparatus for measuring the gear tooth profiles for gears and pinions having an involute configuration.

It is a still further feature of the present invention to provide apparatus for measuring the pitch parameters of involute gear and pinions.

It is yet another feature of the present invention to measure the taper of an involute gear tooth and to measure the parameters of helical involute gears.

It is another feature of the present invention to verify the base pitch parameter of involute gears and pinions.

It is yet a further feature of the present invention to provide a portable apparatus for testing the parameters of involute gears and pinions.

SUMMARY OF THE INVENTION

The aforementioned and other features are obtained, according to the present invention, by providing testing apparatus including tracks upon which wheels, having the base circle radius of the involute gear and coupled to the involute gear, can travel. The testing apparatus includes a probe positioned on a line tangent to the base circle of the involute gear and in contact with gear tooth surface (or profile). As the gear/wheel assembly travels down the tracks, departures of the probe (positioned against the gear tooth) from an equilibrium position are equivalent to departures from the ideal involute gear tooth profile. Using two probes positioned tangent to the base circle, and engaging the same surface of two adjacent gear teeth by each probe, the base pitch parameter can be verified. By changing the position of the probe to be tangent to the pitch circle and by including a positioning element also tangent to the pitch circle, the pitch parameters of the involute gear teeth can be verified. Apparatus is included to permit measurements of departures from a ideal tooth profile in the axial direction and can be used to verify taper or the structure of a spiral or helical gear. A portable testing apparatus is also described using the same principals of operations.

These and other features of the present invention will be understood upon reading of the following description along with the drawings.

DESCRIPTION OF THE PREFERRED EMBODIMENT

1. Detailed Description of the Figures

Figure 1:
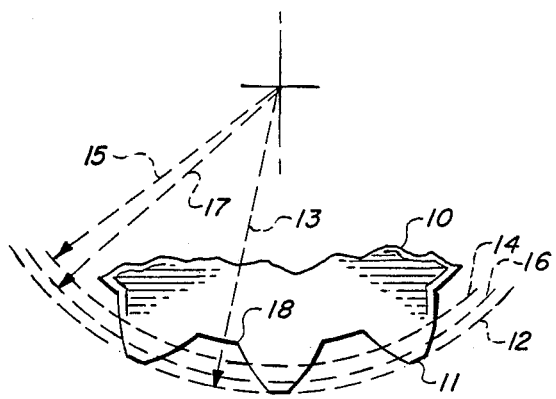
FIG. 1 shows a section of an involute gear or pinion identifying important parameters.

Referring now to FIG. 1, a section of an involute gear is shown. The gear 10 consists of a generally circular body section with a multiplicity of teeth 11 extending therefrom. The gear teeth generally extend from the axis of the gear or pinion a distance determined by radius 13. The base region 18 between gear teeth is generally referred to as the root of the gear tooth. In addition, the involute gear or pinion has associated therewith a base circle 14, having a radius 15 with respect to the axis, and a pitch circle 16, having a radius 17 with respect to the gear or pinion axis. The axis of the base circle, the axis of the pitch circle and the axis of the gear are therefore identical. The intersection of the pitch circle with the surface of a gear tooth is the region of contact between meshed gears. The base circle is a radius having a relationship with the gear teeth that will be described in more detail with reference to FIG. 2A.

Figure 2C:
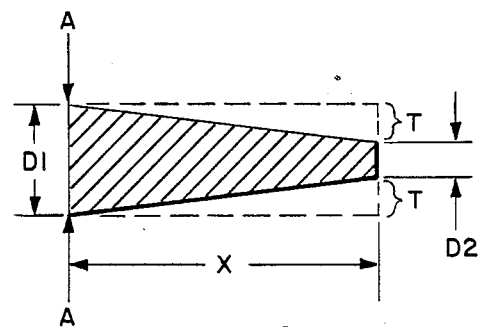
FIG. 2C illustrates the taper of an involute gear tooth which can be measured by the present invention.
Figure 2A:
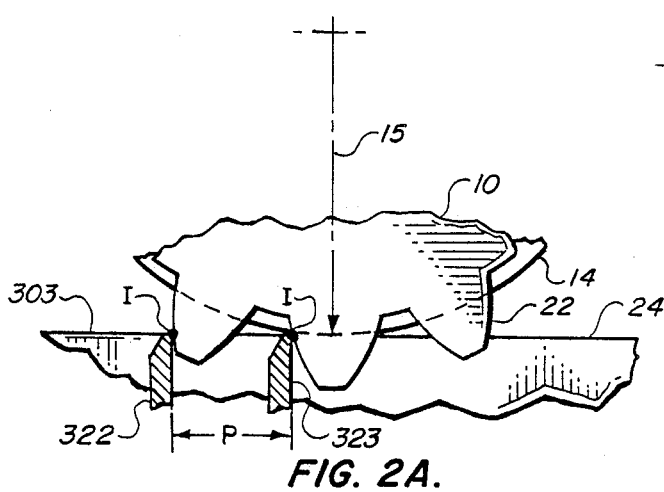
FIG. 2A is an illustration of the property of the involute gear or pinion permitting gear tooth profile and base pitch verification according to the present invention.

Referring next to FIG. 2A, the feature of the involute gear or pinion configuration, upon which a portion of the present invention is based, is illustrated. Track(s) 24 provide(s) a flat surface over which a wheel having the radius of base circle and coupled to the axis of the gear can travel. The track(s) 24 is (are) tangent to the base circle 14. Contour 22 is the exterior surface of the gear teeth 11. When the gear wheel assembly, coinciding with the base circle, travels along track 24, the points I of FIG. 2A, the intersections of contours 22 with the tangent to the base circle radius, remain fixed. The fixed points I, determined by the gear tooth surface and the tangent to base circle 14 when the gear is traveling on the base circle (e.g., by means of attached wheels), are fixed as a result of the definition of the involute gear configuration. Thus, by placing a probe in contact with the involute gear at a point tangent to the base circle and causing the gear with contour 22 to travel on that tangent line (i.e., track 24), departures from the initial point of contact, outside of identified tolerances, indicate improper manufacture, wear, etc. In addition, the distance P between two points 1 on the same surface of a gear tooth intersecting with the base circle will not only not move (because each point will not move), but the parameter P is a quantity referred to as the base pitch and this parameter is used in the verification of the gear structure. As will be clear, this parameter can be tested by two probes positioned against the gear tooth surfaces on the tangent to the base circle.

Figure 2B:
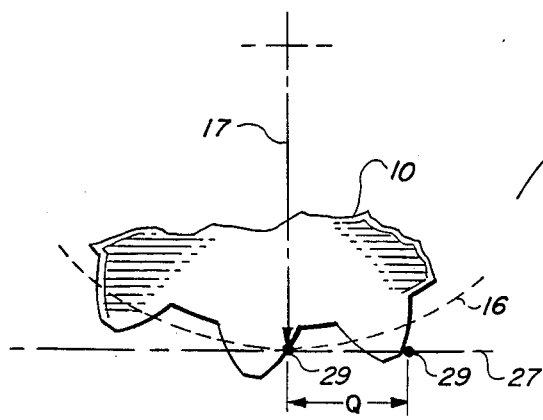
FIG. 2B is an illustration of the property of the involute gear or pinion permitting verification of the pitch parameter by the present invention.

Referring next to FIG. 2B, the technique for testing the pitch parameter i.e., the distance between points 29 for the teeth of the involute gear, is shown. The pitch parameter is the intersection between the tangent line to the pitch circle 16 and the gear tooth profile surfaces. Therefore, as a probe is moved along the intersection of the pitch circle and the gear tooth surface, the pitch parameter can be verified. As will be clear to those skilled in the art of the structure of gears, when points 29 both lie on the pitch circle, Q is the circular pitch chord.

Referring next to FIG. 2C, the taper parameter T of gear tooth 11 parallel to the gear axis is shown with respect to a cross section determined by an intersection of a plane parallel to the gear or pinion axis and the gear tooth. The taper of FIG. 2C occurs as the gear tooth varies from a thickness of D1 to a thickness of D2. The taper parameter T is specified to be the same over the entire tooth profile (parallel to the gear axis). To verify the tooth taper, a probe must therefore be able to travel in parallel to the gear axis and measure changes in distance perpendicular to the direction of travel. Although a linear taper has been illustrated in FIG. 2C, it will be clear that more complex profiles can be verified when profile is specified as a function of the distance x and the apparatus verifying the taper parameters must be able to measure that dimension. The taper is typically measured along the intersection of the pitch circle and the tooth surface.

Figure 2D:
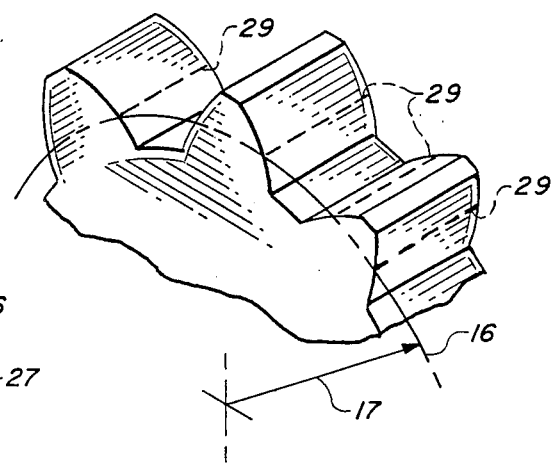
FIG. 2D is a perspective view of a section of a helical or spiral involute gear and illustrating the pitch parameter tested by the present invention.

Referring next to FIG. 2D. the configuration that permits the verification of the parameters of spiral or helical involute gear is shown. In this Figure, the lines 29 illustrate the intersection of a pitch circle with the surface of gear teeth as in FIG. 2B. For non-tapered involute gear teeth, these lines 29 will be straight lines, and therefore verification of the tooth profiles can be performed by measuring out of tolerance departures from intersection of the pitch circle and the gear tooth surface as a function of distance relative to the gear axis. The pitch parameter will be a function of the distance along gear axis and the rotation of the spiral or helical involute gear for a probe constrained to move in a direction parallel to the gear or pinion axis. It will be clear that spiral or helical gear or pinion can have a taper parameter complicating the determination of the out of tolerance conditions.

Figure 3A:
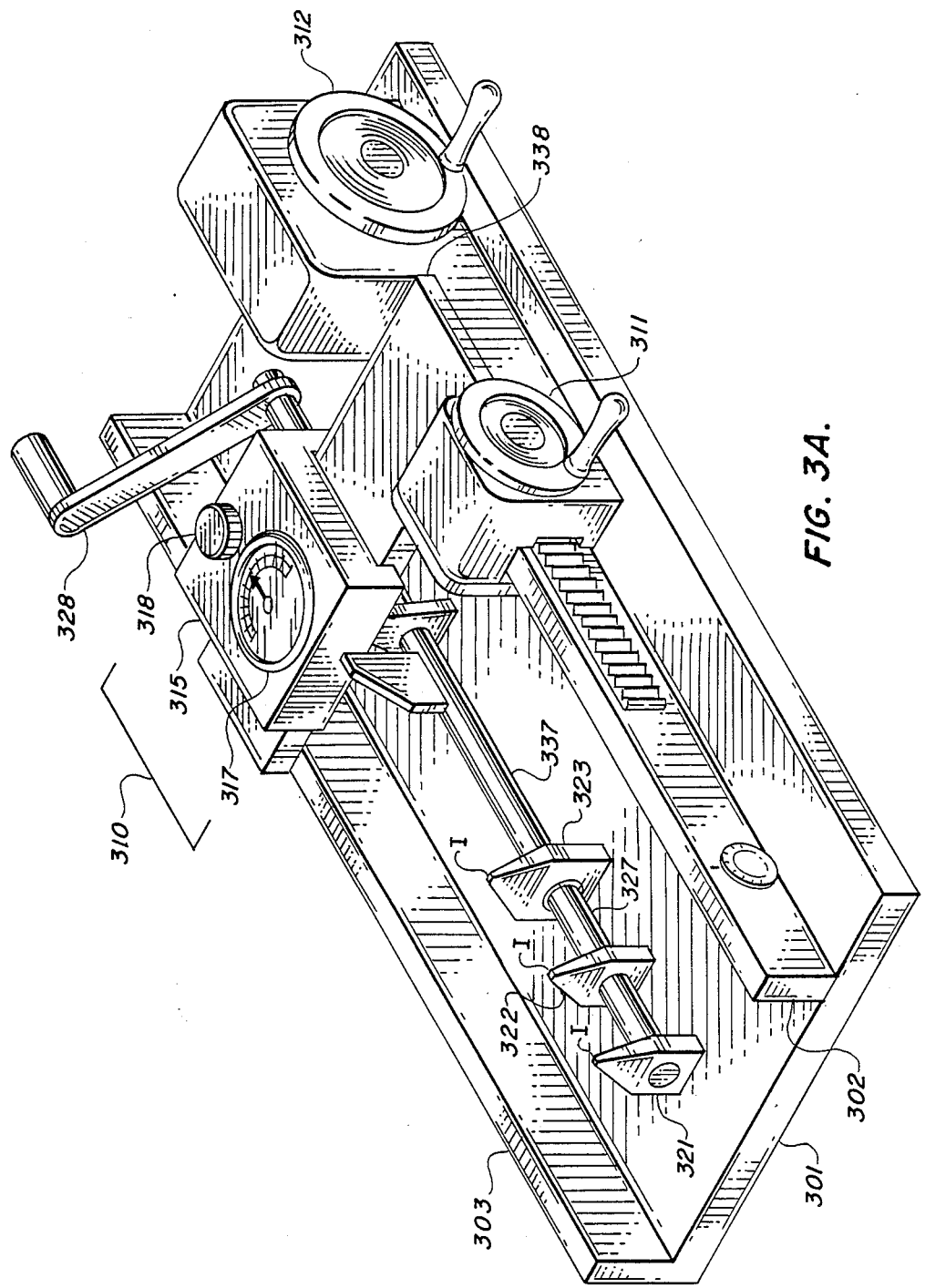
FIG. 3A is a perspective view of the apparatus for measuring and testing the parameters of the involute gear according to the present invention.

Referring next to FIG. 3A, the apparatus for measuring the parameters of an involute configuration gear or pinion is shown. Attached to the base member 301 are two tracks 302 and 303. The remainder of the apparatus forms a carriage 310 that can be moved lengthwise along the tracks by hand-wheel advance mechanism 311. The purpose of the carriage is to position probes 321, 322 and 323 relative to the tracks 301 and 302. The probes 321 and 322 are coupled to the measurement frame 315 of carriage 310 by shaft 327. Probe 323 is coupled to shaft 337, while probes 321 and 322 are coupled to sliding shaft 327, which slides inside shaft 337, shaft 337 being attached to the measurement frame 315. When probe 323 is fixed, the displacements of probes 321 and/or 322 can be determined. The measurement frame 315 is coupled to cross carriage member 338. The cross carriage member 338 along with the measurement frame 315, shaft 337 and the probes 321, 322 and 323 can be moved in the direction perpendicular to the tracks 303 and 302 by hand-wheel advance mechanism 312. Displacement indicator 317 measures the displacement of probes 321 or 322 from an equilibrium position, while knob 318 provides a zero set mechanism for the displacement indicator 317. It will be clear that displacement indicator 317 can be replaced by an electronic measuring apparatus and the electronic measuring apparatus can include printing devices for plotting or otherwise displaying the deviation from the theoretical value of involute surface profile as a function of displacement. Arm 328 can be used to rotate arms 321, 322 and 323 as will be discussed below from a position on a tangent to the base circle to a position tangent to the pitch circle.

Figure 3B:
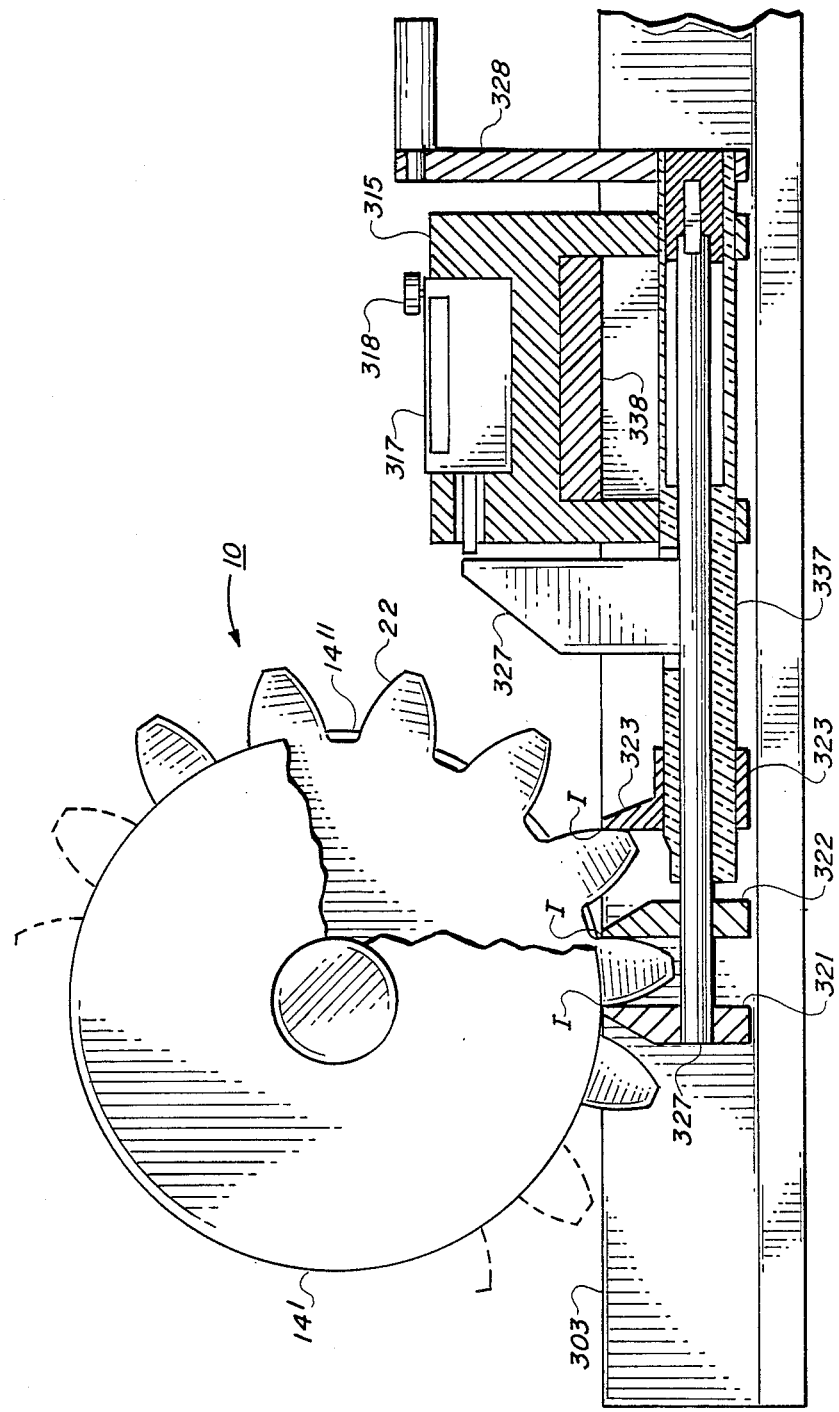
FIG. 3B is a cross sectional view of the apparatus of FIG. 3A.

Referring to FIG. 3B, a cross sectional view of the measuring apparatus is shown. The visible wheel 14″, having a circumference coincident with the gear base circle, is coupled concentrically to gear 10 and rests on track 303. A second wheel, 14′, also having a circumference coincident with the gear base circle, is coupled to the gear 10 and rests on track 302, (not shown). The probes 321, 322, and 323 as shown in contact with surfaces of the gear teeth. The contact points I, indicated in 2A, are also shown. Probes 321 and 322 can be used to measure displacements of the gear tooth surfaces on opposite sides of a gear tooth during travel of the gear/wheel assembly, while the displacement between probes 322 and 323, measured by displacement indicator 317, can measure departures from the correct value of the base pitch.

2. Description of the Preferred Embodiment

The operation of the present invention can be understood as follows. A gear or pinion having an involute tooth profile is required to be tested. A pair of base circle wheels having the radius of the gear base circle are coupled to the gear in such a manner as to be axially symmetric therewith to form a gear/wheel assembly. The base circle wheels are fabricated in such a manner and/or are coupled to the gear in such a manner that the wheels can travel along tracks 302 and 303. The base circle wheels are positioned on the tracks 302 and 303 in a manner such that a probe, 321 or 322, is positioned in the plane defined by the surfaces of the two tracks. Wherever, the probe is located, it will therefore be on a tangent to the base circle, the tracks 302 and 303 being tangent to the base circle. The probe is placed in spring-loaded contact with a tooth surface, of FIG. 2A, point I and the gear/wheel assembly is caused to travel down the tracks. When the involute gear has been properly fabricated, the travel of the gear/wheel assembly will result in no displacement of the probe that are not within the specified tolerances (except at the outer edge and near the root of the tooth). In this manner, departures from the correct profiles of involute gear teeth perpendicular to the gear axis can be tested and measured. The probes of the present invention are spring-loaded to ensure that the probe can make continuous contact with the gear tooth during the test and verification activity. The hand-wheel advance mechanism 311 permits the positioning of the probe (321 or 322) prior to the beginning of the measurement procedure. In the preferred embodiment, measurement apparatus 317 has a zero adjust mechanism 318 that permits a simple measurement procedure of the departure from the specified profile. The two probes permit the testing of both sides of a gear tooth profile without rotating the gear/wheel assembly.

The verification of the pitch circle parameter P can be accomplished by the present invention in the following manner. Probe 321 is, for example, not used. Probes 322 and 323 are adjusted so that the two contact points of the probes are on a tangent line to the pitch circle. The zero adjust mechanism 318 is adjusted so that the distance between the contact points of probes 322 and 323 is zero when the distance between the probes is the pitch circle parameter P. Probe 322 is coupled to the displacement indicator 3]7, while probe 323 is fixed relative to displacement indicator 317. The probe 323 is placed in contact with one gear tooth and is spring-loaded to force the probe in contact with the adjacent gear tooth, any out of specification reading displacement will be measured on the displacement indicator 317. The gear/wheel assembly can be rotated to test that the pitch circle parameter P is maintained for all orientations of the gear. Even when the pitch parameter P is not precisely known, this technique can verify that the deviations found in the pitch circle parameters do not exceed the specified deviations.

Referring to FIG. 2B, and FIG. 2C, the pitch parameter and the taper or other functionality of the involute gear tooth parallel to the axis of the gear can be measured by using hand-wheel advance mechanism 312 to move carriage 310, and consequently the probes, in a direction parallel to the gear axis. The probe, spring-loaded against the gear tooth surface, will cause the displacement indicator 317 to record out of tolerance deviations. The hand-wheel advance mechanism 312 is calibrated to correlate deviations in the surface perpendicular with the carriage movement, i.e., the x direction. Hand-wheel advance mechanism 311 is also calibrated to provide a distance measurement along the track. To change the position of the probes from a tangent to the base circle to a tangent to the pitch circle, arm 328 is rotated. The pitch parameter is typically measured on directly beneath the gear or pinion axis, i.e., on the pitch circle radius.

Referring to FIG. 2D, the technique of testing the parameters of a spiral or helical involute gear is illustrated. In this procedure, the hand-wheel advance mechanism 312 is used to move carriage 310 and the associated probe(s) parallel to the gear axis, the probe being positioned tangent to the pitch circle. Measuring the departures of the probe from a known profile as function of linear distance along the gear axis and as a function of gear or pinion rotation will permit verification of the fabrication for spiral or helical gears.

The present invention can be operated in such a manner that the base circle wheel and gear assembly can be rotated without travel along the tracks to measure the individual gear tooth profiles. According to another mode of operation of the present invention, the tracks 302 and 303 can be extended and the base circle wheel and gear assembly rotated with travel along the extended tracks. The hand-wheel advance mechanism 311 can be advanced by known increments prior to the measurement of the individual tooth profiles. In this manner, not only can the tooth profiles be tested, but the position of the gear teeth themselves can be determined.

In addition to departures from the profiles in the radial direction, certain types of manufacturing procedures or certain types of wear can result in a departure from an ideal profile in an axial direction. To verify this parameter, the hand-wheel advance mechanism 312 can move the probe (either 321 or 322) in contact with the gear surface after the hand wheel advance mechanism 311 has been locked to prevent inadvertent movement. When the hand-wheel advance mechanism 312 is calibrated, the departures from the ideal profile in the axial direction can also be determined.

When tracks 302 and 303 are not and/or when the gear to be measured are not too large, the testing apparatus can be portable and can be transported to the site of the gear or pinion usage. The testing and verification activity is relatively uncomplicated and requires only a minimum amount of training. Profiles can be determined in a cursory manner or can be determined with precision. The parts of the gear testing apparatus can be replaced relatively easily.

In order to obtain a portable testing apparatus, particularly for measuring the gear profile and the base circle pitch parameter, the testing configuration can be altered to eliminate the need for the potentially heavy tracks 302 and 303. In this embodiment, the probe(s) is (are) constrained to travel along a tangent member (a member perpendicular to the gear axis and a gear radius) so that the probe(s) coupled thereto are constrained to travel on a line tangent to the base circle of the gear or pinion. The tangent member is coupled to a radial member, the radial member permitting the tangent member to rotate freely about the axis of the gear or pinion while constraining the probe(s) to move to along a line tangent to the base circle. As will be clear, the tangent member is analogous to the tracks 302 and 303, while tangent member is analogous to the base circle wheels. By placing the probe(s) in contact with a gear tooth surface and rotating the tangent and radial members, for a correctly fabricated involute gear or pinion, the probe(s) will remain fixed in space as long as contact is made with an appropriate portion of the gear surface.

The displacement measuring apparatus can be fixed with respect to a gear axis and the deviations from a null position measured as the tangent and radial members are rotated about the gear or pinion axis.

It will be clear that the apparatus for testing and verification of gear parameters can be automated without departing invention. However, such automation techniques will impact the cost of the apparatus.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. Apparatus for measuring departures from an ideal gear tooth profile for an involute gear, said apparatus comprising:
   a first and a second wheel adapted to be concentrically mounted on each side of said involute gear, an outer surface of each of said first and said second wheel having a same radius as a base circle of said involute gear;
   track apparatus having a linear surface, said linear surface including a first and a second surface for having said outer wheel surfaces applied thereto;
   probe apparatus having a probe point for contacting a gear tooth surface of said involute gear, said probe point measuring departures from an equilibrium position; and
   adjusting apparatus coupled to said track apparatus and to said probe apparatus for positioning said probe point in contact with said gear tooth surface of said involute gear in a plane parallel to an involute gear axis and coinciding with said linear surface.

2. The gear measuring apparatus of claim 1 wherein said adjusting apparatus includes carriage apparatus for moving said probe point parallel to said involute gear axis.

3. The gear measuring apparatus of claim 2 wherein said carriage apparatus is used in conjunction with said probe point to measure parameters selected from the group of parameters consisting of gear tooth taper and helical gear characteristics.

4. The gear measuring apparatus of claim 1 wherein said probe apparatus includes a second probe point for contacting a second involute gear surface in said plane coinciding with said linear surface, wherein said probe apparatus measures departures from an equilibrium separation between said probe point and said second probe point.

5. The gear measuring apparatus of claim 4 wherein said probe point and said second probe point are positioned in a plane determined by a line tangent to a pitch circle of said involute gear and a line parallel to said involute gear axis.

6. The method of testing parameters of an involute gear, said method comprising the steps of:
   positioning a probe in a tangent plane, said tangent plane being parallel to an axis of said involute gear and tangent to a base circle of said involute gear;
   forcing said probe against a tooth surface of said involute gear,
   coupling a first and a second wheel having a radius equal to a radius of said base circle concentrically on each side of said involute gear;
   causing said wheels coupled to said involute gear to rotate without slipping on said tangent plane; and
   measuring displacements of said probe during said travel of said involute gear.

7. The method of testing gear parameters of claim 6 further comprising the step moving said probe parallel to an axis of said involute gear when said involute gear is stationary to measure a taper of an involute gear tooth.

8. The method of testing gear parameters of claim 6 further comprising the steps of:
   positioning said probe and a second probe in said tangent plane;
   positioning said probe and said second probe on the same surface of two adjacent gear teeth;
   rotating said involute gear without slipping on said tangent plane; and
   measuring a displacement between said probe and said second probe during said rotating said involute gear.

9. Apparatus for measuring parameters of an involute gear or pinion, said apparatus comprising:
   a first and a second wheel attached concentrically to each side of said gear or pinion, said wheels each having an outer surface with a radius of a base circle of said involute gear or pinion;
   travel means having a surface tangent to said base circle when said tangent surface is in contact with said first and second wheel outer surfaces;
   a probe;
   probe positioning means coupled to said probe and to said travel means for positioning said probe in a plane in contact with a tooth surface of said involute gear or pinion, said plane including said travel means surface and said plane being parallel to an axis of said involute gear or pinion; and
   measuring means coupled to said probe and to said probe positioning means for measuring a displacement of said probe when said wheels travel without slipping on said travel means surface.

10. The parameter measuring apparatus of claim 9 further comprising carriage means coupled to said probe positioning means and said probe for moving said probe parallel to an axis of said involute gear or pinion.

11. The parameter measuring apparatus of claim 10 further comprising;
    a second probe coupled to said probe positioning means and positioned in said plane in continuous contact with a first surface off an involute gear or pinion tooth;
    wherein said positioning means positions said probe in continuous contact with a first surface of an adjacent involute gear or pinion tooth tangent in said plane; and
    wherein said measuring means measures a change in distance between said probe and said second probe when said when said first and second wheels travel without slipping on said travel means surface.

12. The parameter measuring apparatus of claim 10 wherein said probe positioning means includes a handwheel advance mechanism.

13. An apparatus for testing selected parameters of an involute gear or pinion, said apparatus comprising:
    displacement measuring apparatus;
    a first and a second radial member connected to said involute gear or pinion, said first and said second radial members each having a contact surface concentric with an axis of said involute gear or pinion and having a radius equal to a base circle radius of said involute gear or pinion said first and said second radial members coupled on each side of said gear or pinion;

a first and a second linear member adapted to be in contact with said first and said second radial members respectively, said first and second linear members having surfaces tangent to said base circle when said first and second radial member surfaces are in contact with said first and second linear member surfaces; and at least one probe coupled to said first and said second linear members and constrained to a surface while in contact with an involute gear or pinion tooth surface, said surface being determined by said linear member surfaces and being parallel to an axis of said involute gear or pinion, wherein said probe is coupled to said displacement measuring apparatus and said displacement measuring device is coupled to said linear members.

14. The involute gear or pinion parameter testing apparatus of claim 13 wherein said displacement measuring apparatus measures a displacement by said probe when said radial members travel without slipping on said linear members, said one probe being in contact with said gear or pinion tooth surface during said radial member travel.

15. The involute gear or pinion parameter testing apparatus of claim 14 further comprising a second probe coupled to said displacement measuring apparatus, said displacement measuring apparatus measuring displacement between said probe and said second probe, said probe and said second probe positioned against similar gear or pinion tooth surfaces of consecutive involute gear or pinion teeth in a plane coinciding with said linear member surfaces said displacement between said probe and said second probe used to measure a base pitch parameter.

* * * * *